April 11, 1950
C. N. HICKMAN
2,503,269
ROCKET PROPELLED ILLUMINATING FLARE
Filed June 1, 1944
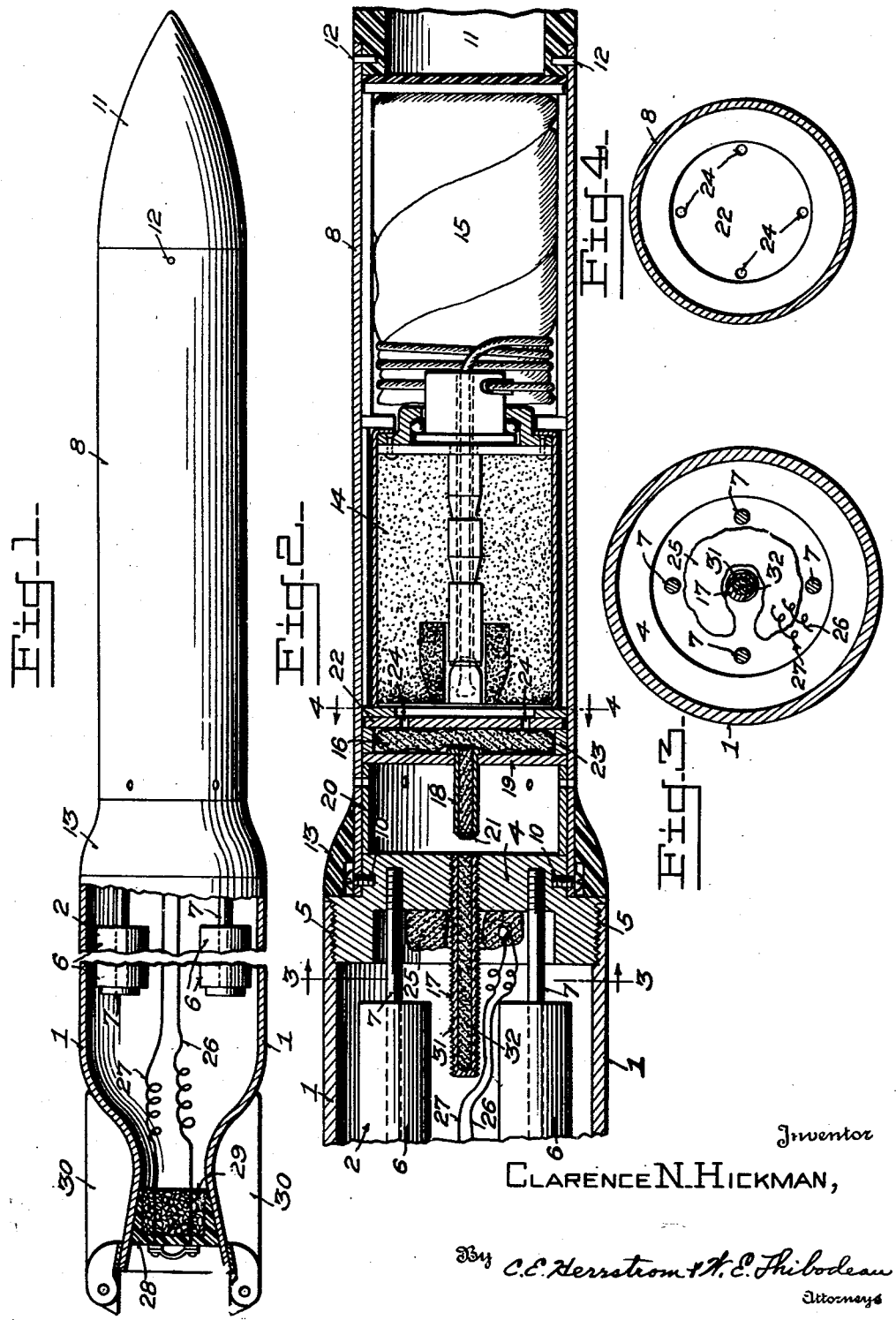
Inventor
CLARENCE N. HICKMAN,
By C.E. Herrstrom & H.E. Thibodeau
Attorneys Patented Apr. 11, 1950

2,503,269

UNITED STATES PATENT OFFICE 2,503,269

ROCKET PROPELLED ILLUMINATING FLARE

Clarence N. Hickman, Jackson Heights, N. Y.

Application June 1, 1944, Serial No. 538,316

4 Claims. (Cl. 102—49)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a rocket propelled parachute illuminating flare.

Aircraft used for coastal defense and for other purposes have experienced considerable trouble in spotting and attacking enemy craft at night, particularly submarines owing to the difficulty of differentiating between enemy and friendly ships in time to attack such ships on the initial approach run without circling. The time necessary to circle for attack and observation of the suspected ship gives an enemy submarine an opportunity to submerge.

Accordingly it is an object of this invention to provide a rocket propelled parachute flare for the purpose of illuminating a target area at a distance from the point of launching the rocket.

Another object of this invention is to provide means for preventing moisture from contacting the propellant charge to avoid decomposition of such charge.

The specific nature of the invention as well as other objects and advantages thereof will clearly appear from a description of a preferred embodiment as shown in the accompanying drawing in which:

Fig. 1 is a side elevational view of the rocket flare shown partly in longitudinal section.

Fig. 2 is an enlarged fragmentary detail longitudinal sectional view of Fig. 1.

Fig. 3 is a cross-sectional view taken along the plane 3—3 of Fig. 2.

Fig. 4 is a cross-sectional view taken along the plane 4—4 of Fig. 2.

There is shown in Fig. 1 in assembled relation, a rocket projectile embodying this invention. A rocket motor housing 1 contains a rocket propellant charge 2. The housing 1 terminates in a nozzle 3 of conventional Venturi construction. Nozzle 3 may be integrally formed as shown or may be of separate construction, if desired. An adapter 4 (Fig. 2) is inserted in the forward end of motor housing 1 and is secured thereto as by threads 5. Propellant charge 2 comprises a plurality of cylindrical powder grains 6, each having an axial hole. The powder grains 6 are mounted on a plurality of "wormhead" type of powder traps 7 by threading powder grains 6 on such traps. Traps 7 are mounted parallel to the axis of rocket motor housing 1 and are concentrically disposed within such housing. The forward end of each powder trap 7 is screwed into suitably threaded holes in plug 4.

A parachute flare housing 8 is placed over the forward end of adapter 4 which is of reduced diameter and is secured to such adapter by screws 10. An ogival head 11, preferably of a suitable plastic material, is secured to the forward end of housing 8 as by shear pins 12. The shear pins 12 are constructed from a material of low shear strength for a purpose to be explained. A cowling 13 surrounds flare housing 8 and abuts the end of adapter 4 to provide a smooth streamlined joint where housing 8 joins housing 1. The cowling 13 is preferably made of a suitable plastic material.

A parachute flare of the type disclosed in U. S. Patent No. 1,978,641 to Martin, comprising a flare 14 and a parachute 15, is preferably utilized. Such parachute flare is inserted in flare housing 8 so that flare 14 is placed adjacent a flare expulsion charge 16.

A thermal igniter 17 and a delay train 18 of the type described in my copending application for Thermal Igniter Serial No. 538,314, filed June 1, 1944, now Patent No. 2,459,163, are employed to ignite flare expulsion charge 16. Delay train 18 is axially mounted in a disc 19. The disc 19 is substantially separated from adapter 4 by a tubular spacer 20 which abuts such adapter. Delay train 18 comprises a metallic tube filled with a sulfurless powder which is arranged to be ignited by a black powder cap 21 suitably fastened to the end of delay train 18. Expulsion charge 16 comprising a small charge of black powder is retained by a disc 22 placed parallel to the disc 19 and separated from such disc by a collar 23. Collar 23 prevents the powder charge 16 from being crushed. A plurality of holes 24 are provided in disc 22 to permit the gases generated by the combustion of charge 16 to escape and impinge on the base of flare 14.

Delay train 18 is arranged to be ignited by thermal igniter 17 which comprises a hollow threaded member 31 filled with an igniting charge 32 preferably of black powder. Propulsion charge 2 is arranged to be ignited by a conventional electrically fired squib 25 which surrounds thermal igniter 17 and is placed adjacent the rear surface of adapter 4. Lead wires 26 and 27 are connected to squib 25 and pass out thru the orifice in nozzle 3. Such lead wires are connected in suitable fashion to the exterior of housing 1.

To seal the interior of rocket motor 1 against the entrance of moisture, a plug 28 of suitable plastic material is forced into the orifice of nozzle 3. A small bag of moisture absorbing material 29 which may consist of a substance known under the trade name of "Silica Gel" is preferably placed within nozzle 3 to absorb the moisture contained in the air already within the motor housing 1 and to absorb any other moisture that may possibly leak in from other sources. Collapsible stabilizing fins 30 may be mounted on nozzle 3 as shown in Fig. 1 for the purpose of stabilizing the flight of the projectile.

When the rocket projectile containing the parachute flare is discharged from a rocket launcher by discharging squib 25, the heat generated by propulsion charge 2 ignites the black powder charge 32 contained within thermal igniter 17 which in turn ignites delay train 18. The black powder cap 21 provided on the rear end of delay train 18 facilitates the ignition of the sulfurless powder. The burning time of delay train 18 is, of course, adjusted to permit parachute flare to be projected to the optimum height desired for operation of the flare. When delay train 18 has completely burned the flare expulsion charge 16 will then be ignited and the gas blast escaping thru the holes 24 impinge on the base of flare 14. When this occurs, parachute 15 and flare 14 are forced forwardly thereby shearing pins 12 and forcing head 11 off the end of housing 8. Parachute flare 14 is ignited by conventional means upon expulsion of such flare from housing 8 and is slowly lowered over the target area by parachute 15. The delay introduced by delay train 18 is preferably such as to permit the rocket to reach the highest part of its trajectory but obviously can be proportioned to occur at any fixed time after ignition of propellant charge 2.

I claim:

1. A rocket motor comprising a tubular member arranged to define a motor chamber having a constricted exhaust passage at one end thereof, a propellant charge of powder secured within said chamber, and a plug member inserted in said constricted passage, said plug member comprising a moisture absorbing material and being arranged to be discharged from said motor by gas pressure developed by said propellant charge.

2. In combination, a hollow tubular member having a partition defining a forward and rear chamber therein, said rear chamber having a constricted exhaust opening at the rear thereof, a propellant charge mounted within said rear chamber, a flare mounted within said forward chamber, a thermal igniting element interconnecting said forward and rear chamber and constructed to be energized by the heat developed in said rear chamber, a delay train of powder in said forward chamber disposed in ignitable relationship to said thermal igniting element, and a powder charge within said forward chamber constructed and arranged to eject said flare forwardly out of the tubular member.

3. In combination, a hollow tubular member having a partition defining a forward and rear chamber therein, said rear chamber having a constricted exhaust opening at the rear thereof, a propellant charge mounted within said rear chamber, an ogival head secured to the forward end of said tubular member by shear pins, a flare unit mounted within said forward chamber, a thermal igniting element interconnecting said forward and rear chambers and constructed to be energized by the heat developed in said rear chamber, a delay train of powder in said forward chamber disposed in ignitable relationship to said thermal igniting element, and a powder charge within said forward chamber constructed and arranged to blow off said ogival head and eject said flare forwardly out of the tubular member.

4. A rocket motor comprising a tubular member arranged to define a motor chamber having a constricted exhaust passage at one end thereof, a propellent charge of powder secured within said chamber, a moisture-tight plug member inserted in said constricted passage to retard the entrance of moisture to said motor chamber, a second chamber formed in said plug member, and a moisture absorbing material retained in said second chamber and exposed to the interior of said motor chamber.

CLARENCE N. HICKMAN.

REFERENCES CITED

The following references are of record in the file of this patent:

UNITED STATES PATENTS

| Number | Name | Date |
| --- | --- | --- |
| 1,434,784 | Lucas | Nov. 7, 1922 |
| 2,093,353 | Geitmann | Sept. 14, 1937 |
| 2,341,310 | Calhoun et al. | Feb. 8, 1944 |
| 2,344,957 | Anzalone | Mar. 28, 1944 |
| 2,423,859 | Van Karner | July 15, 1947 |

FOREIGN PATENTS

| Number | Country | Date |
| --- | --- | --- |
| 305,160 | Germany | Mar. 3, 1920 |